(12) United States Patent
Kleist

(10) Patent No.: US 11,293,584 B2
(45) Date of Patent: Apr. 5, 2022

(54) MONITOR AND KEYBOARD SUPPORT ARM

(71) Applicant: In2Ergo, Inc., Monrovia, CA (US)

(72) Inventor: Ronald G. Kleist, Santa Rosa, CA (US)

( * ) Notice: Subject to any disclaimer, the term of this patent is extended or adjusted under 35 U.S.C. 154(b) by 206 days.

(21) Appl. No.: 16/622,231

(22) PCT Filed: Jun. 13, 2018

(86) PCT No.: PCT/IB2018/000717
§ 371 (c)(1),
(2) Date: Dec. 12, 2019

(87) PCT Pub. No.: WO2018/229545
PCT Pub. Date: Dec. 20, 2018

(65) Prior Publication Data
US 2020/0191321 A1 Jun. 18, 2020

Related U.S. Application Data

(60) Provisional application No. 62/519,060, filed on Jun. 13, 2017.

(51) Int. Cl.
*F16M 11/10* (2006.01)
*F16M 11/04* (2006.01)

(52) U.S. Cl.
CPC .......... *F16M 11/10* (2013.01); *F16M 11/046* (2013.01); *F16M 2200/022* (2013.01); *F16M 2200/063* (2013.01)

(58) Field of Classification Search
USPC .......... 248/121, 122.1, 123.11, 123.2, 124.1, 248/125.7, 125.9, 162.1, 415, 917, 919, 248/920, 921, 922, 923
See application file for complete search history.

(56) References Cited

U.S. PATENT DOCUMENTS

| | | |
|---|---|---|
| 6,584,645 B2 | 7/2003 | Migli |
| 7,416,163 B2 * | 8/2008 | Gaida .................... F16M 11/10 248/325 |
| 9,357,846 B2 | 6/2016 | Hung |
| 9,657,889 B1 | 5/2017 | Chumakov |
| 2011/0147546 A1 * | 6/2011 | Monsalve .......... F16M 11/2092 248/122.1 |
| 2011/0149510 A1 * | 6/2011 | Monsalve .............. F16M 11/38 361/679.55 |

* cited by examiner

*Primary Examiner* — Alfred J Wujciak

(57) ABSTRACT

A monitor support comprises: a static arm (16) configured to mount rotatably to a monitor support arm (10) at a lower end and a support arm junction (30) at an upper end; a moving arm (34) pivotally attached to the static arm (16) at the support arm junction (30) with a first pair of one-way freewheel friction hubs (36*a*, 36*b*) that includes first and second one-way cam assemblies (70*a*, 70*b*, 72*a*, 72*b*) and friction disc assemblies coaxially mounted to the support arm junction (30). The moving arm (34) includes monitor mounting structure and preferably includes a second pair of one-way freewheel friction hubs (44*a*, 44*b*) coupled to a VESA mounting plate (46) with a quick disconnect assembly. The monitor support and the monitor support arm (10) permit free movement in elevating a mounted monitor and require the application of force exceeding that of the monitor weight to lower a mounted monitor.

18 Claims, 20 Drawing Sheets

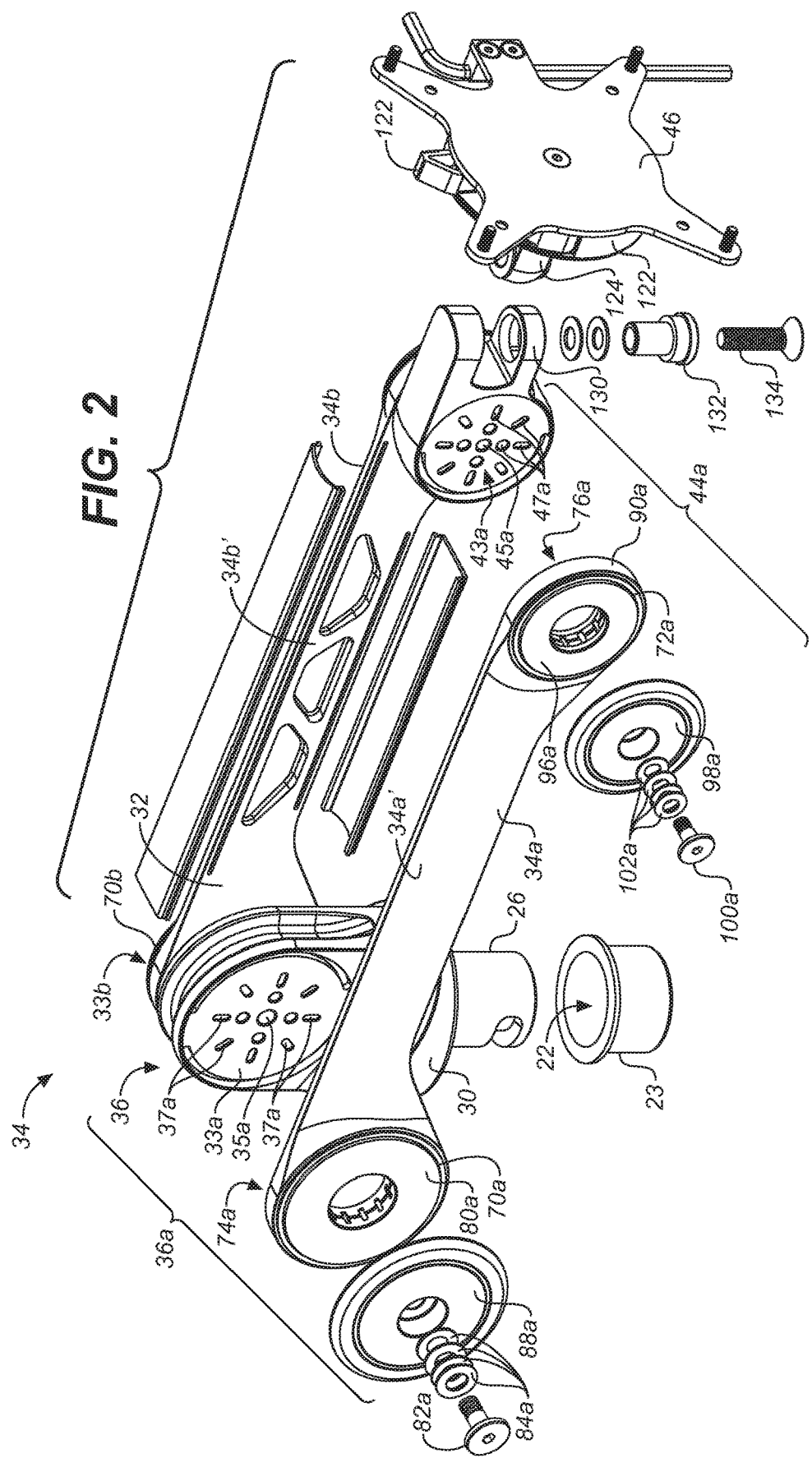

MONITOR AND KEYBOARD SUPPORT ARM

BACKGROUND OF THE INVENTION

Technical Field

The present invention relates most generally to computer workstations and computer equipment support apparatus, and more particularly to video monitor support devices, and still more particularly to two-arm monitor support for a flat screen display panel.

Background Art

Monitor support arms are well known. However, with the advent of shared and/or sit-stand computer workstations and the frequency with which monitor height must be adjusted, computer users have placed an increased demand on support arms for flat screen display panels. The demand is that they provide users with an easy and rapid way to adjust monitor height and angle without requiring Herculean strength or time-consuming clamp adjustments while also providing secure and stable support for the monitor. Accordingly, monitor support arms have undergone a relatively rapid evolution in design. Even so, until the present invention, the demand has largely gone unmet.

As is well known, monitor support arms for flat screen monitors enable a user to adjust a mounted monitor over a fixed distance, both vertically and horizontally. As physiatry, ergonomics, and the occupational health and safety sciences have matured, their findings have become nearly universal understanding in industry. The reduction of neck and back strain, pain, and injury, as well as eye strain, and the desired increase in workplace productivity, has brought considerable focus to such apparatus as workplace seating, desktop configurations, keyboard and mouse supports, document supports, and monitor supports. The ability to adjust monitor viewing position so as to minimize strain and maximize comfort is now recognized as a critical component in achieving both the occupational health and safety goals of injury reduction and the industry goals of increased productivity and efficiency.

Extant monitor supports typically include a lower arm pivotally attached at its lower (proximal) end to a mounting member of some kind—generally a post clamped to a desktop or workstation upper surface. Less commonly, the mounting member may be adapted for attachment to a wall or other vertical surface. For monitor supports with only a single arm, at a distal end of the arm is a flat display mounting interface, or VESA mount, almost invariably designed in compliance with VESA mounting interface standards to attach to a flat screen having a VESA mounting hole pattern on its backside. The VESA mount is typically attached to the distal end of the support arm using either a single axis pivot joint or a dual axis universal joint.

Many contemporary monitor supports include an upper support arm pivotally attached to the lower support arm. In such designs the VESA mount is at the distal end of the upper arm.

Adjustment of monitor positions, and articulation of the joints in such support arms, is accomplished in a variety of ways. The requirements, as previously noted, include the capability of the arms to support the weight of the flat screen display while also providing a convenient and rapid way to adjust the monitor height and angle. The development of ultrathin LED and LCD monitors and other lightweight monitors has made existing technologies more suitable for the support requirements, though the corresponding development and increased use of large screen displays has offset that achievement.

Two well-known technologies broadly employed by numerous manufacturers and constituting the state of the art in the field include, in combination, gas strut and spring-assisted parallelogram linkages. The assemblies enable support of heavy monitors and generally easy adjustment of height and tilt/pan, but they are themselves heavy, expensive, "clunky" in appearance, and commonly include structure than can pinch or crush fingers during movement. In addition, gas spring or gas strut assemblies invariably include considerable "bounce" as the assembly is moved, for instance in a sit-stand workstation. This results in the need to manually stabilize a monitor after workstation height adjustment. The "bounce" is most annoying when a user is concentrating on the screen while typing and vibrations of the work surface caused by the typing are conveyed to the due to the upward urging of the spring/gas strut.

The above-reference prior art reflect the current state of the art of which the present inventors are aware. Reference to, and discussion of, these patents is intended to aid in discharging Applicant's acknowledged duty of candor in disclosing information that may be relevant to the examination of claims to the present invention. However, it is respectfully submitted that no prior art products or publications disclose, teach, suggest, show, or otherwise render obvious, either singly or when considered in combination, the invention described and claimed herein.

DISCLOSURE OF INVENTION

The monitor support arm of the present invention provides a dramatic improvement that realizes the objectives outlined above with lightweight, attractive, and mechanically reliable structural and operational components. It achieves its essential objectives in an embodiment by combining one or more one-way freewheel/friction hubs (which are modified trapped roller one-way freewheel and friction clutches), which permit free movement in elevating a mounted monitor and which require the application of force exceeding that of the monitor weight to lower a mounted monitor. In another embodiment, parallel links are coupled to the hubs to create a four-bar linkage that reduces the force required by a user to make height adjustments while at the same time providing increased load support.

As a principal object and advantage, the inventive monitor support maintains any device (monitor, keyboard tray, or both, in a constant tilt and pan regardless of vertical movements up and down to adjust device height, a feature common to high quality monitor supports.

Thus, and yet another distinct object and advantage of the present invention, is that the act of adjusting the height of a monitor or keyboard does not also require corresponding adjustments in monitor/keyboard tray tilt.

Still another object and advantage of the present invention is to provide a hub assembly spacing that multiples the resistance of the hub (pivot point) brake function.

Yet another object and advantage is to provide a monitor support arm that uses no counterbalancing force yet enables a user to adjust height with a light and simple pull or push with one hand while simultaneously allowing a much greater range of motion, thus enabling use of a shorter, more compact height adjustment arm to produce a wide range of motion. Stated somewhat differently but describing the same characteristic feature and advantage, the monitor/keyboard support arm of the present invention provides adjustable resistance to rotation in one direction (i.e., the direction lowering a supported device, or in the same direction as the force of gravity) and little to no resistance in an opposing direction (in the direction elevating the supported device). This is accomplished using a one-way friction hub in combination with a gravity-based trapped roller clutch.

Another object and advantage is to provide a monitor support arm highly suited for use in ergonomic sit-stand workstations, which does not conduct "bounce" to the monitor but instead remains very still and stable as the workstation surface is elevated or lowered and during typing or other keyboard inputs.

In an embodiment, a first (lower, proximal, or primary) hub controls height and a second (upper, distal, or secondary) hub controls tilt angle, and both cooperate to enable adjustments which position the monitor according to user preferences.

In another embodiment, and upper link and a lower link are incorporated in the distal or secondary (moving) arm. The links are coupled to the primary and secondary hubs to create a four-bar (parallelogram) linkage. In this embodiment the primary hub controls height and as coupled to the secondary hub via two rigid links, a parallelogram four-bar linkage is provided to keep the monitor at a fixed tilt when the secondary arm is moved up and down. Testing shows that the embodiment lacking the four-bar links supports only about half the load of the embodiment including the four-bar linkage with identical hubs in each test unit.

In still another embodiment, the lower link of the immediately foregoing embodiment is replaced by a gas lift (aka gas spring or gas strut) pivotally connected to the primary hub at a proximal end and to a point slightly proximal from the secondary hub at a distal end. The gas strut combines with the upper link to move the center of rotation onto the primary hub and provides increased holding power to secure the moving arm in a fixed position.

Other novel features which are characteristic of the invention, as to organization and method of operation, together with further objects and advantages thereof will be better understood from the following description considered in connection with the accompanying drawing, in which preferred embodiments of the invention are illustrated by way of example. It is to be expressly understood, however, that the drawing is for illustration and description only and is not intended as a definition of the limits of the invention. The various features of novelty which characterize the invention are pointed out with particularity in the claims annexed to and forming part of this disclosure. The invention resides not in any one of these features taken alone, but rather in the particular combination of all of its structures for the functions specified.

BRIEF DESCRIPTION OF THE DRAWINGS

The invention will be better understood and the objects and advantages other than those set forth above will become apparent when consideration is given to the following detailed description thereof. Such description makes reference to the annexed drawings wherein:

FIG. 2 is an exploded upper left perspective view of the monitor support moving arm, shown detached from the monitor mount;

FIG. 3B is an upper left rear partial exploded view thereof; ditto 3a

BEST MODE FOR CARRYING OUT THE INVENTION

Figure 1A:
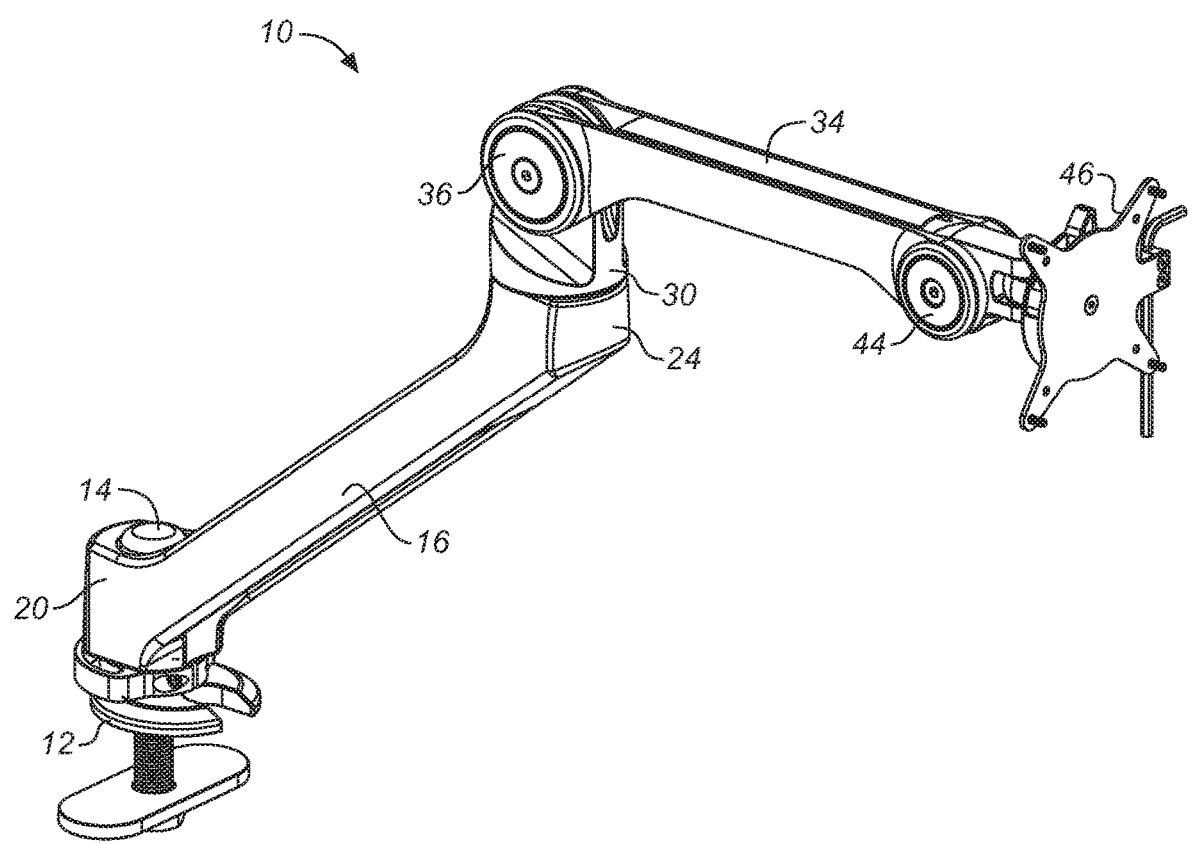
FIG. 1A is an upper left front perspective view of the monitor support arm of the present invention.

Referring to FIGS. 1 through 19C, wherein like reference numerals refer to like components in the various views, there is illustrated therein a new and improved monitor and keyboard support arm, generally denominated 10 herein.

Figure 1B:
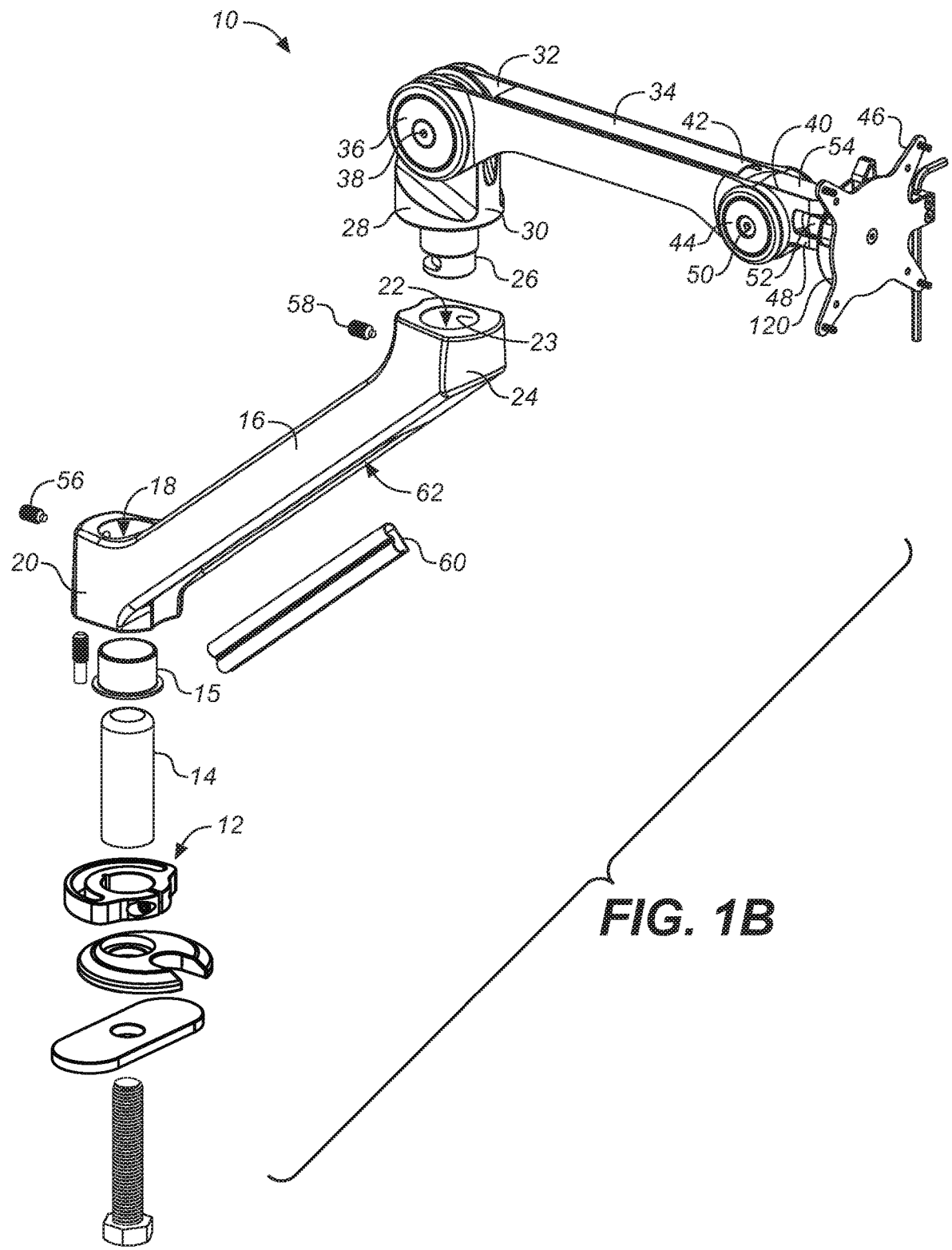
FIG. 1B is a partial exploded view thereof, showing the moving (upper) arm uncoupled from the static (lower) arm, and the lower arm uncoupled from the vertical support post.
Figure 3B:
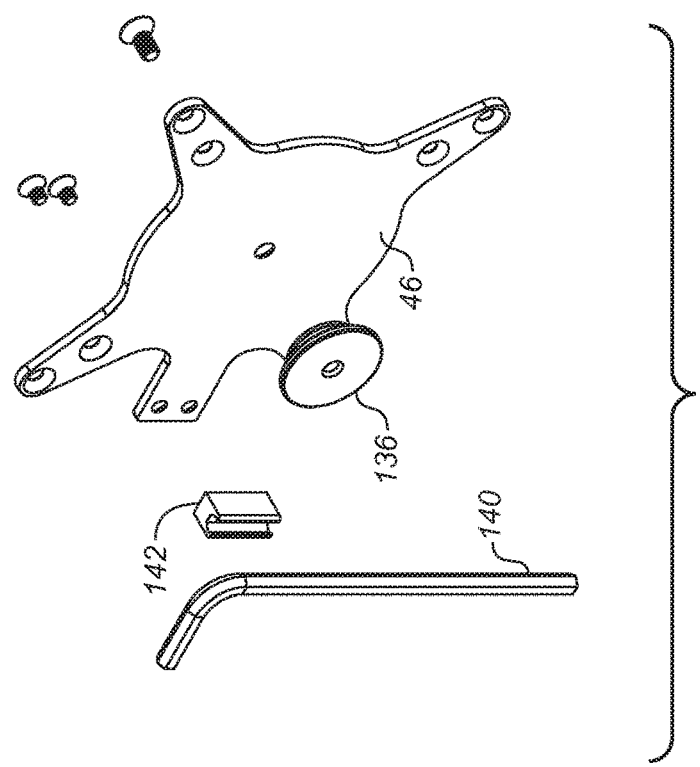
Figure 3A:
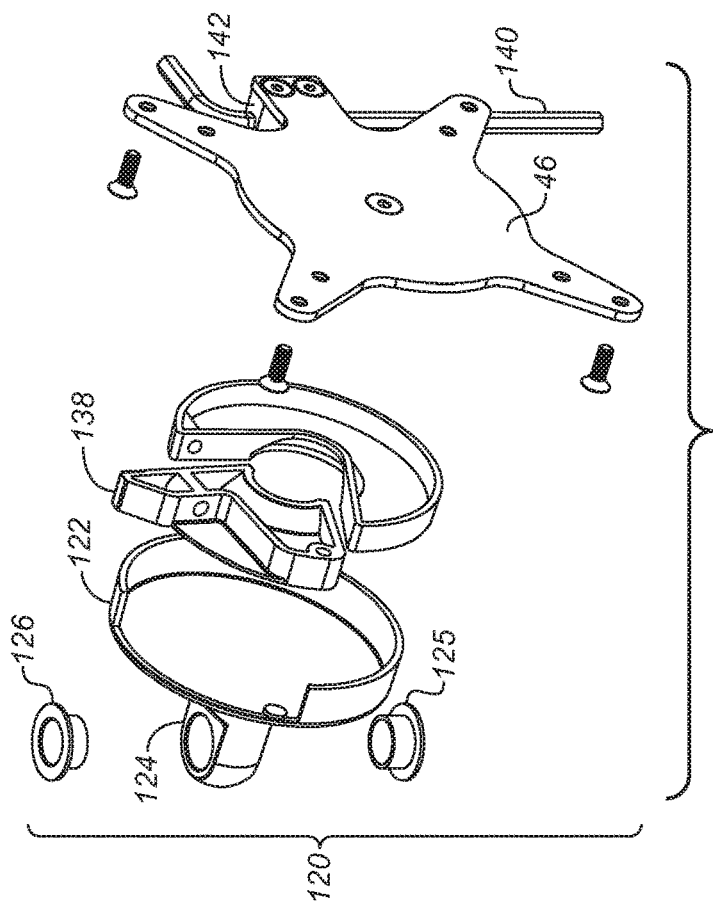
FIG. 3A is an upper left front exploded view of the VESA monitor mount used in the present invention.

Referring now to the drawings, there is shown in FIGS. 1A-1B a monitor support arm 10 according to an embodiment of the present invention. In the most basic terms, the monitor support arm first includes a table clamp and mounting and support assembly 12, which has a vertically oriented cylindrical anchor pole 14. A static arm 16 having a cylindrical hole or socket 18 at its proximal end 20 is pivotally (rotatingly) connected to the anchor pole so as to provide a range of 360 degrees of rotation of the static arm 16 in a horizontal plane around the vertical axis provided by the anchor pole 14. (In another embodiment, the anchor pole does not extend through the proximal end of the static arm.) A low friction flanged nylon bushing 15 facilitates both insertion and monitor arm movement. In an embodiment, the low friction flanged bushing 15 are snap bushings and not press-fit types, as shown. In such an embodiment, the bushing may be a cylindrical with a split from top to bottom so that it can be expanded to fit over the shaft 14, which has a groove to accept the bushing. This design alternative reduces mounting labor and allows for closer tolerances. The static arm includes a second cylindrical socket 22 at its distal end 24 into which a low friction flanged nylon bushing 23 is inserted and then into which is inserted a cylindrical support shaft 26 at the lower portion 28 of a static arm junction (referred to herein as a support arm junction) 30. Again, a press-fit design may be used in an alternative embodiment.

At the upper end 32 of the support arm junction, and looking now at FIG. 2 in addition to FIGS. 1A-1B, a moving arm 34 is pivotally coupled to the support arm junction at a proximal (first) pair of one-way freewheel friction hubs 36a, 36b (considered as a pair, the proximal hub 36). (In another embodiment, there may be a single cam/brake assembly in the height control hub joining the static arm with the moving arm.) This joint provides approximately 160 degrees of elevation/depression (−75 to +85 degrees) in a vertical plane about the horizontally oriented axis 38 provided by the proximal hub 36. In turn, the support arm junction provides a full 360 degrees of rotation of the moving arm 34 in a horizontal plane about the vertically oriented cylindrical axis 26 provided by the support arm junction connection to the static arm 16.

The monitor support arm further includes a tilt joint 40 pivotally coupled to the distal end 42 of the moving arm 34, through a distal (second) pair of one-way freewheel and friction hubs 44a, 44b (considered as a pair, the distal hub 44). A VESA mounting plate 46 (i.e., having a VESA hole pattern) is pivotally coupled to the distal end 48 of the tilt joint. The tilt joint rotates 180 degrees in a vertical plane about the horizontally oriented axis 50 provided by the distal hub 44. The monitor mount rotates 180 degrees in relation to the tilt joint about a vertical axis 52 disposed in the distal end 54 of the tilt joint, the plane of motion being dependent on the position and attitude of the tilt joint and the mounting plate relative to the horizon. First and second set screws 56, 58 maintain the static and moving arm in the horizontal plane. When in use an elongate cord organizer 60 disposed in a channel 62 in the static arm 16 helps maintain the elegant appearance of the monitor aesthetics.

In another embodiment, pan, tilt, and rotation motions (including movement from landscape to portrait orientations of the monitor) may be achieved with the inclusion of a ball joint at the VESA mounting plate. [See FIGS. 11-15]

Figure 4:
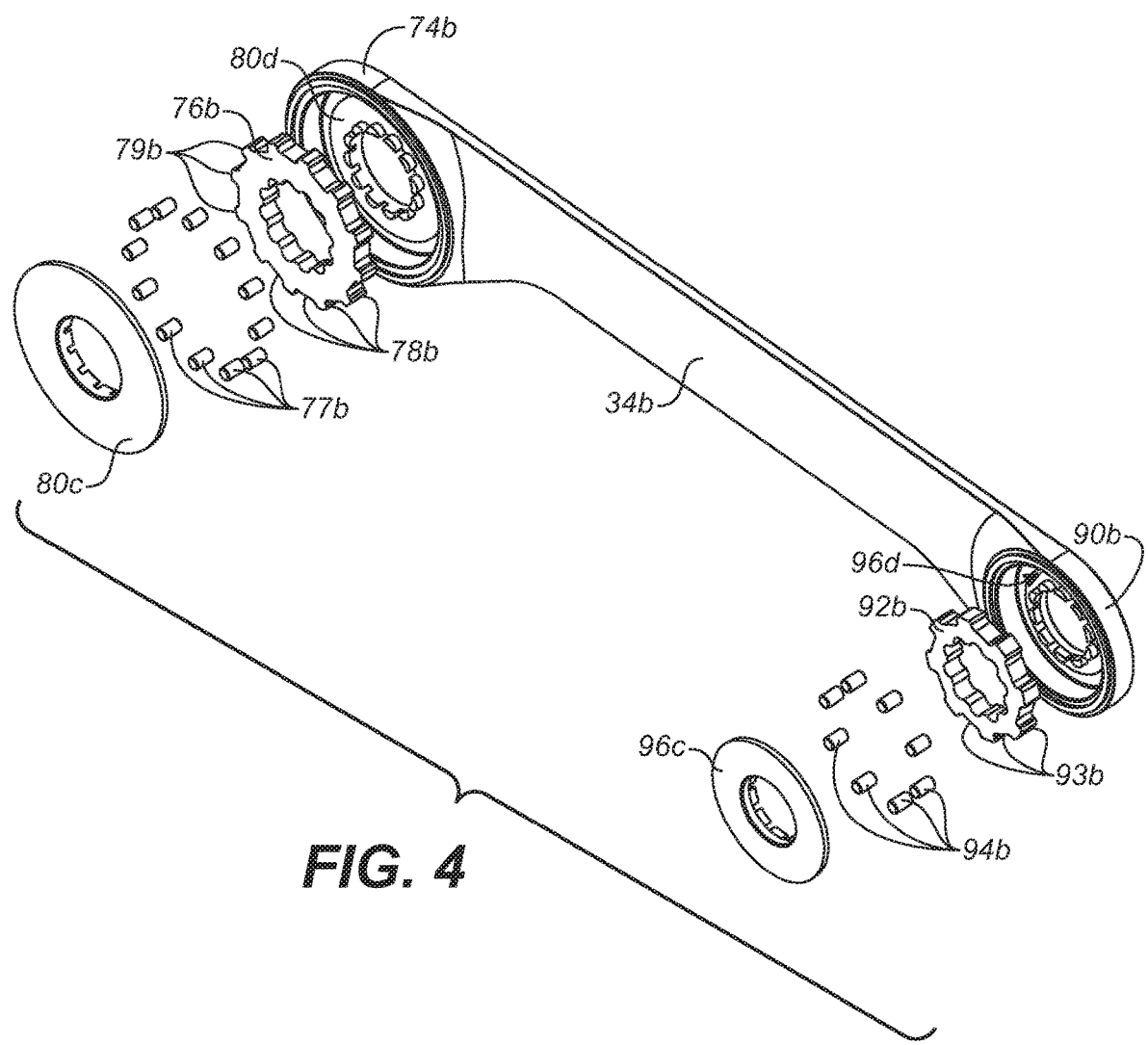
FIG. 4 is an upper left front partial exploded view showing the right side arm assembly of the support moving arm.
Figure 11:
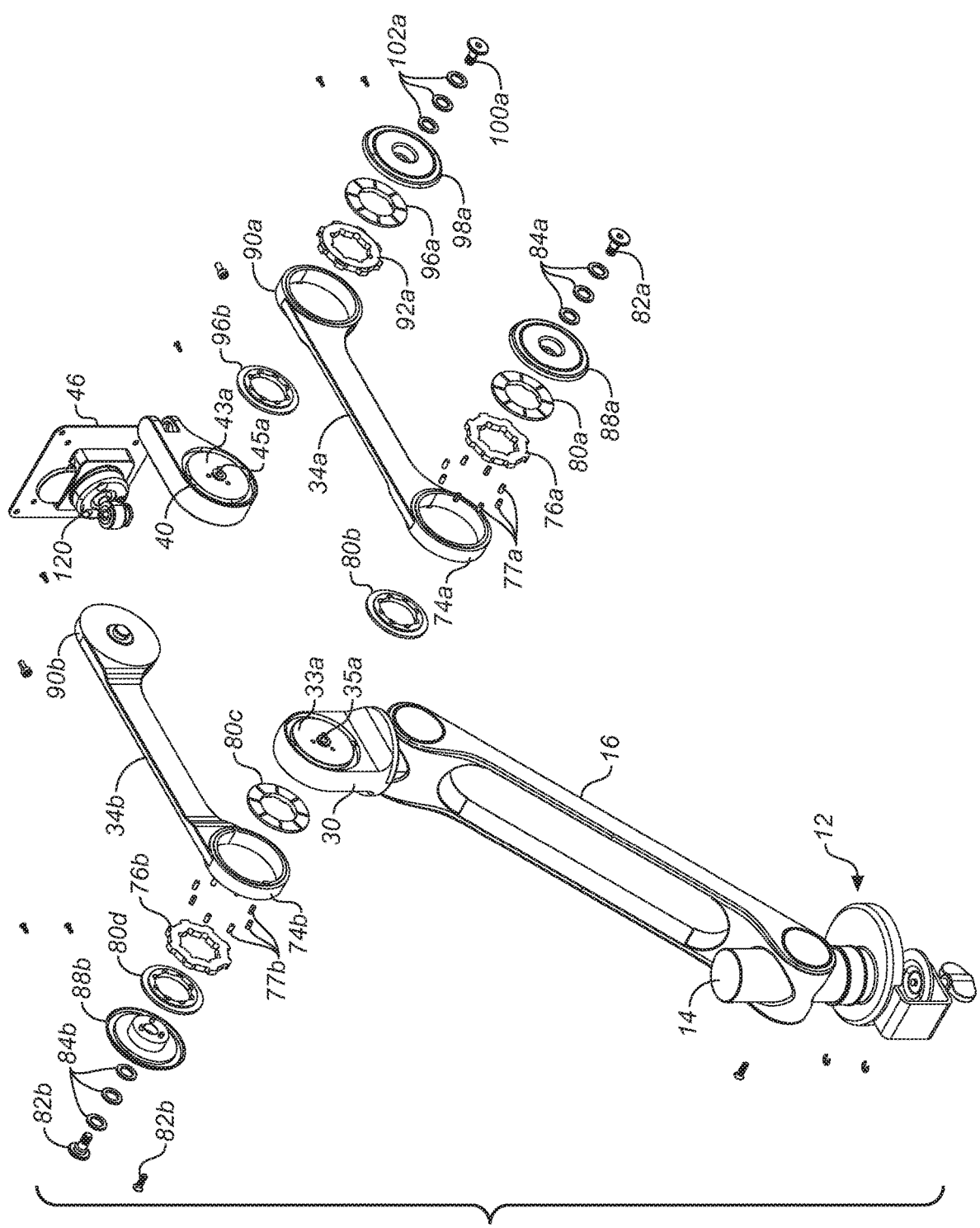
FIG. 11 is an upper left rear partial exploded perspective view of an embodiment of the monitor support having only double trapped roller ("one way friction") hubs for supporting a monitor weight, this view showing details of the upper support arm.
Figure 12:
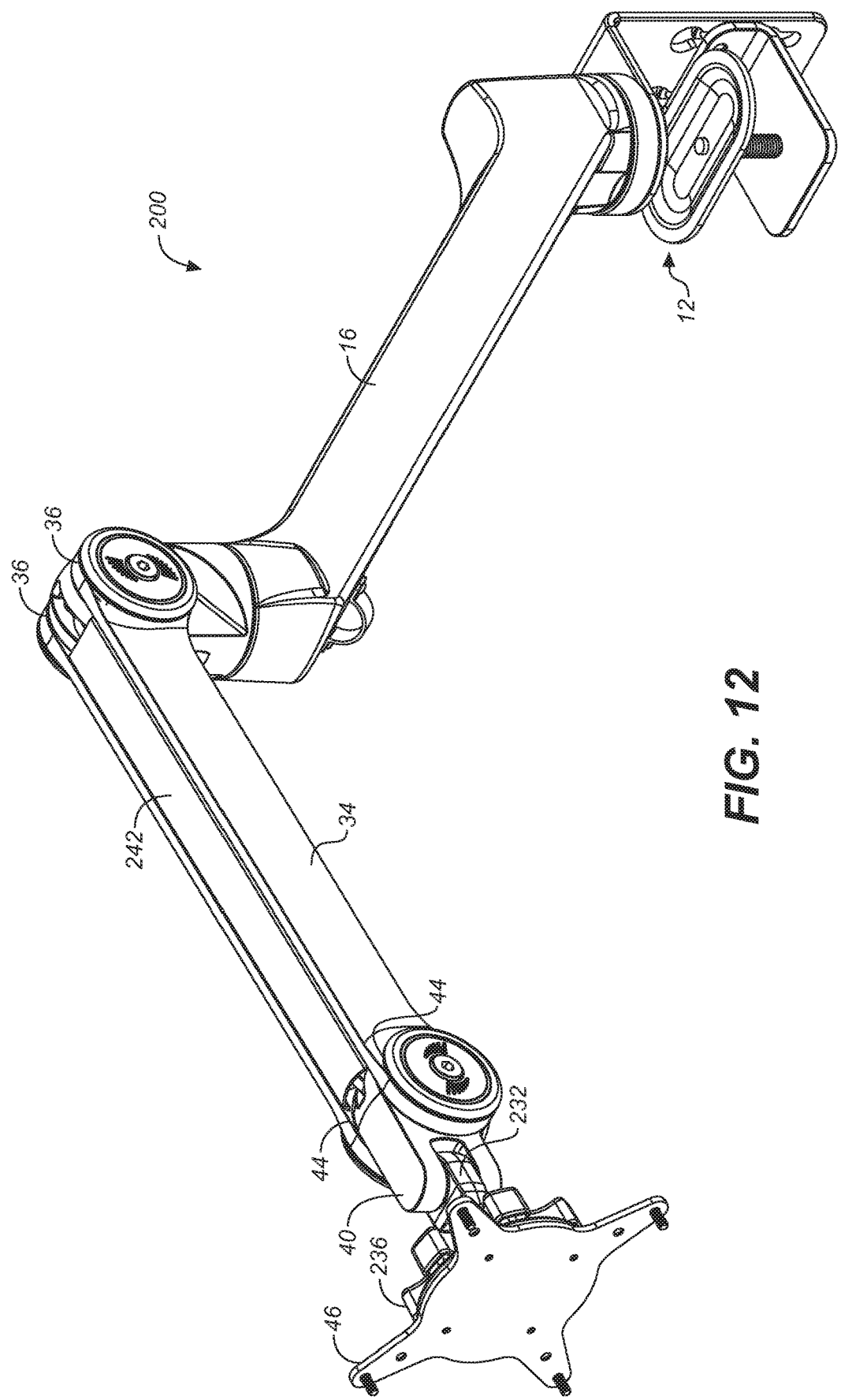
FIG. 12 is an upper front right perspective view of an alternative embodiment of the monitor support.
Figure 13A:
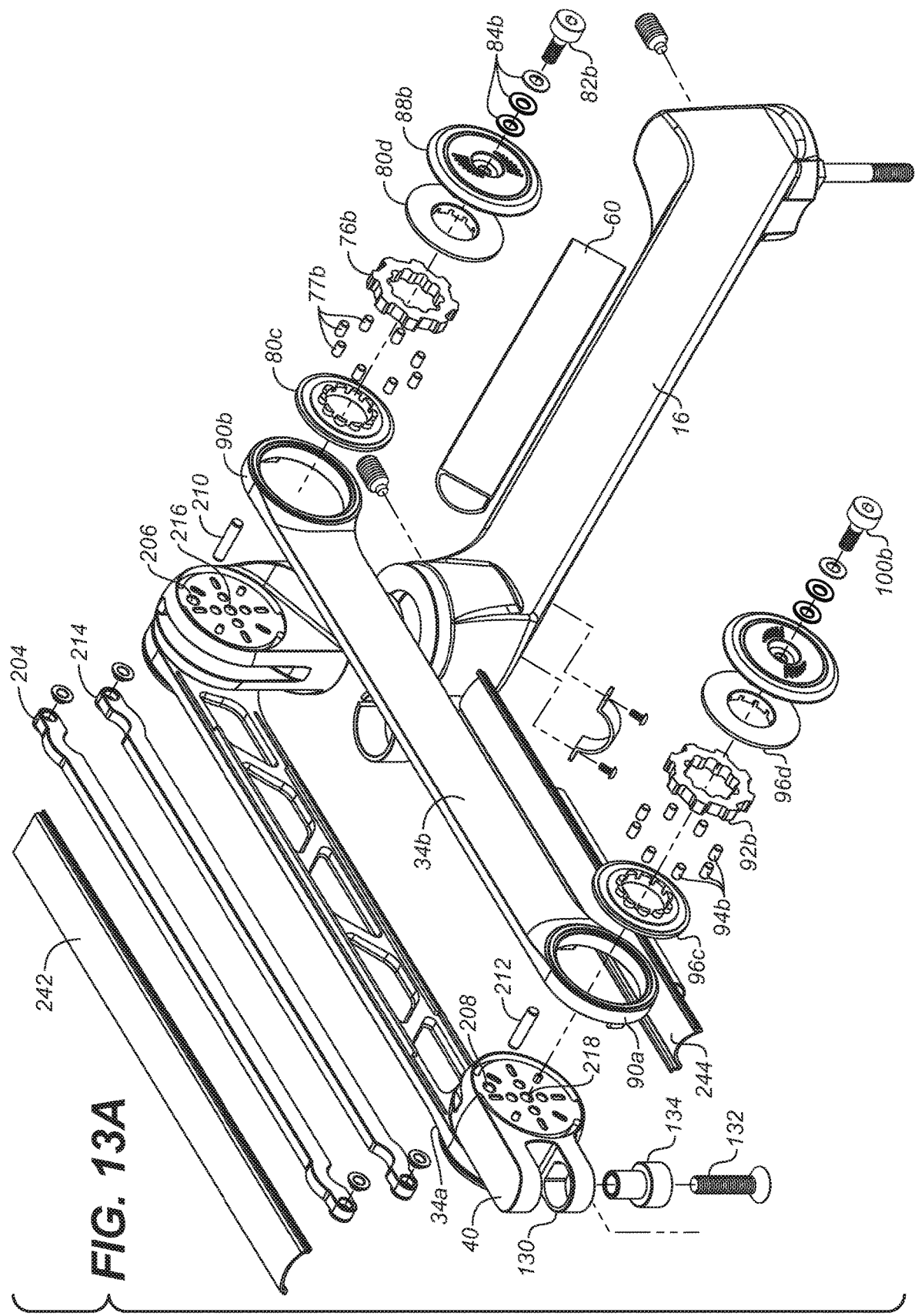
FIG. 13A is an upper right front partial exploded view thereof, showing a parallelogram 4-bar linkage coupling the moving arm to the support arm junction.
Figure 13B:
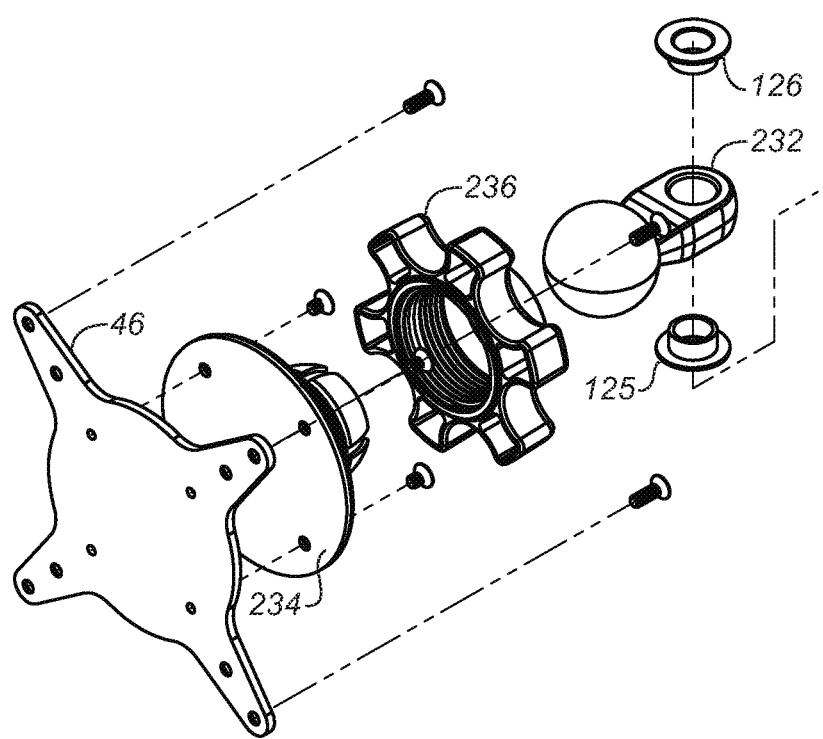
FIG. 13B is an upper right front perspective view showing the swivel mount employed in an embodiment.
Figure 14:
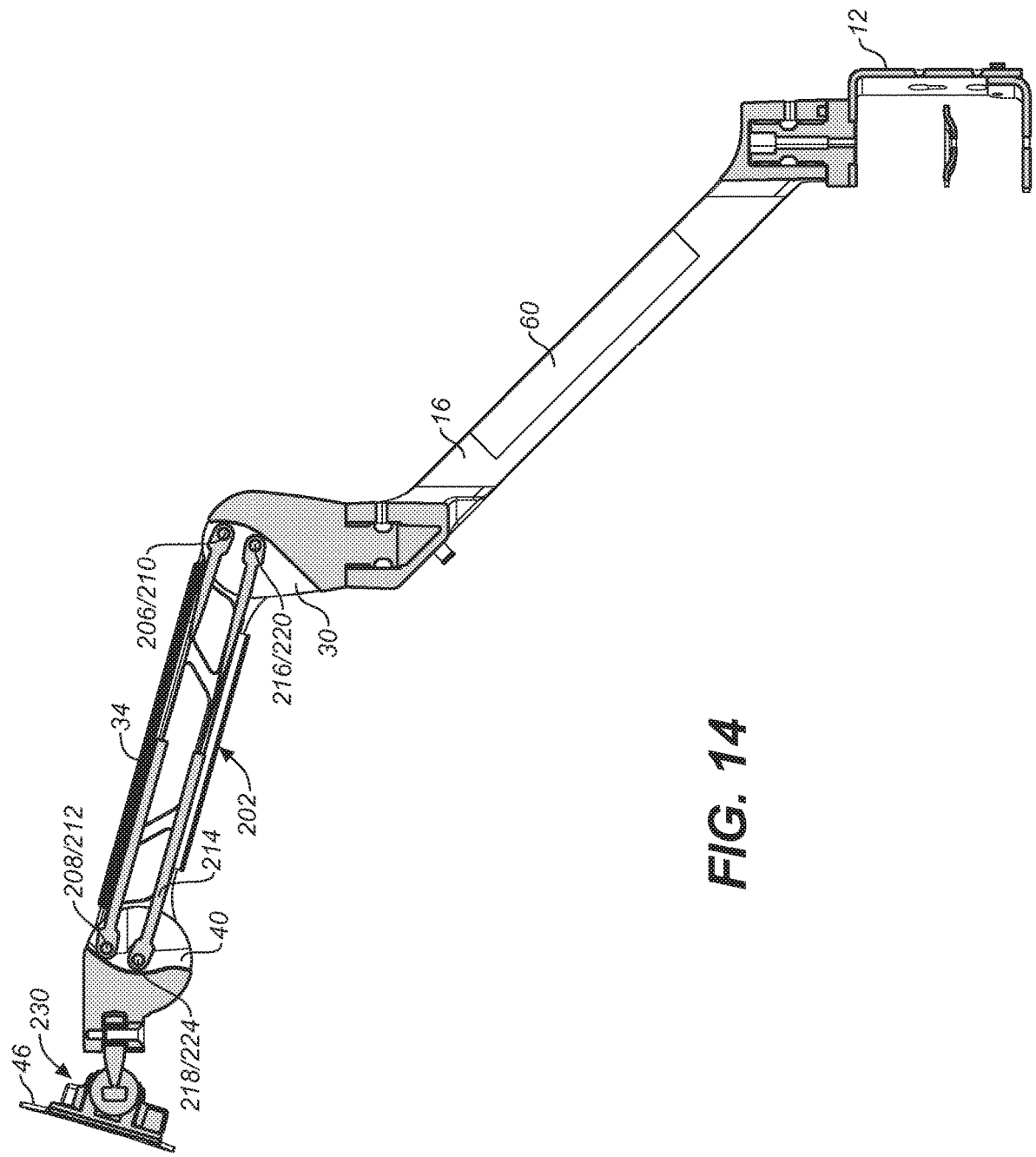
FIG. 14 is a right side cross-sectional view in elevation thereof as take along section line 14-14 of FIG. 12.
Figure 15:
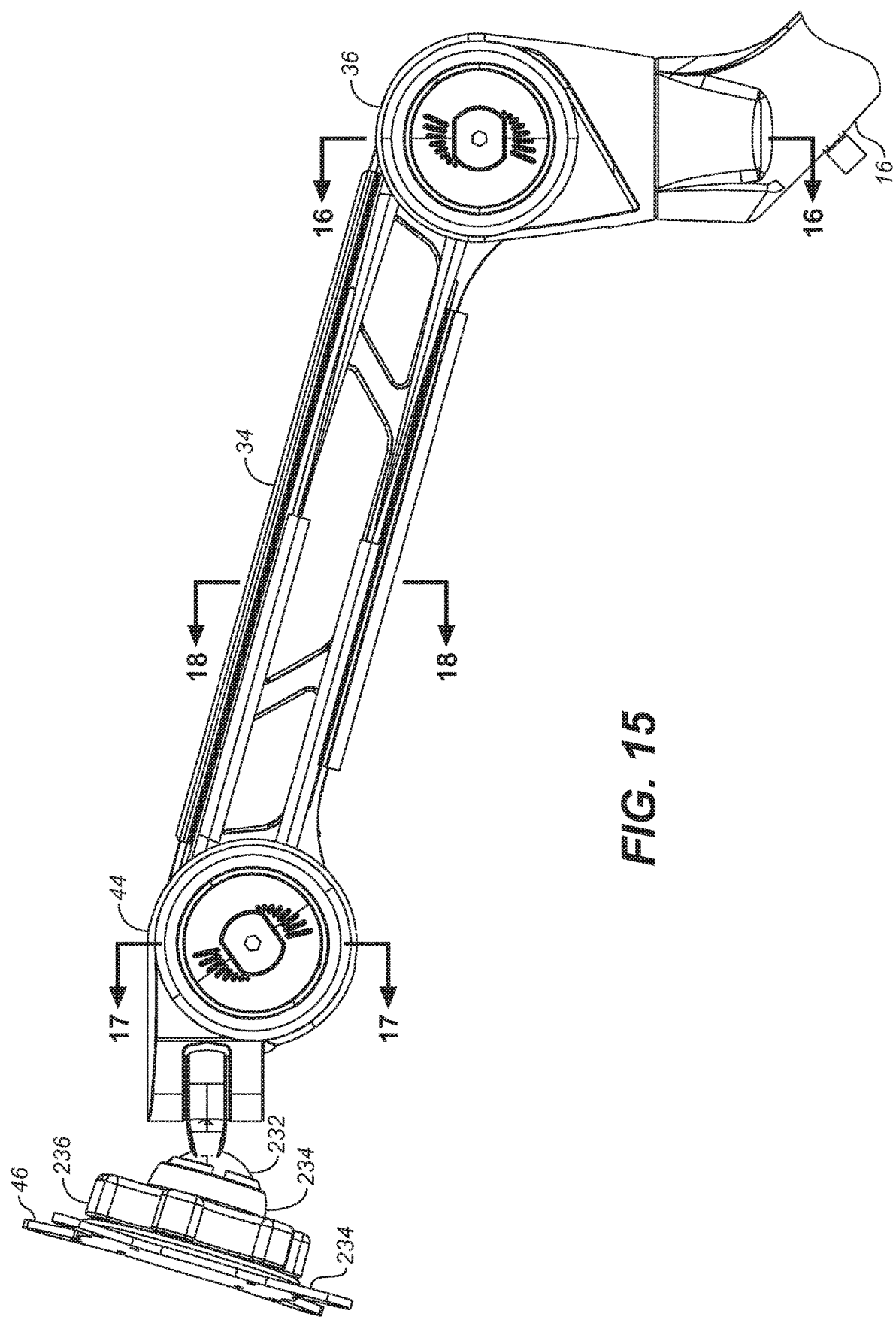
FIG. 15 is a right side view in elevation featuring the upper arm and monitor mount.
Figure 16:
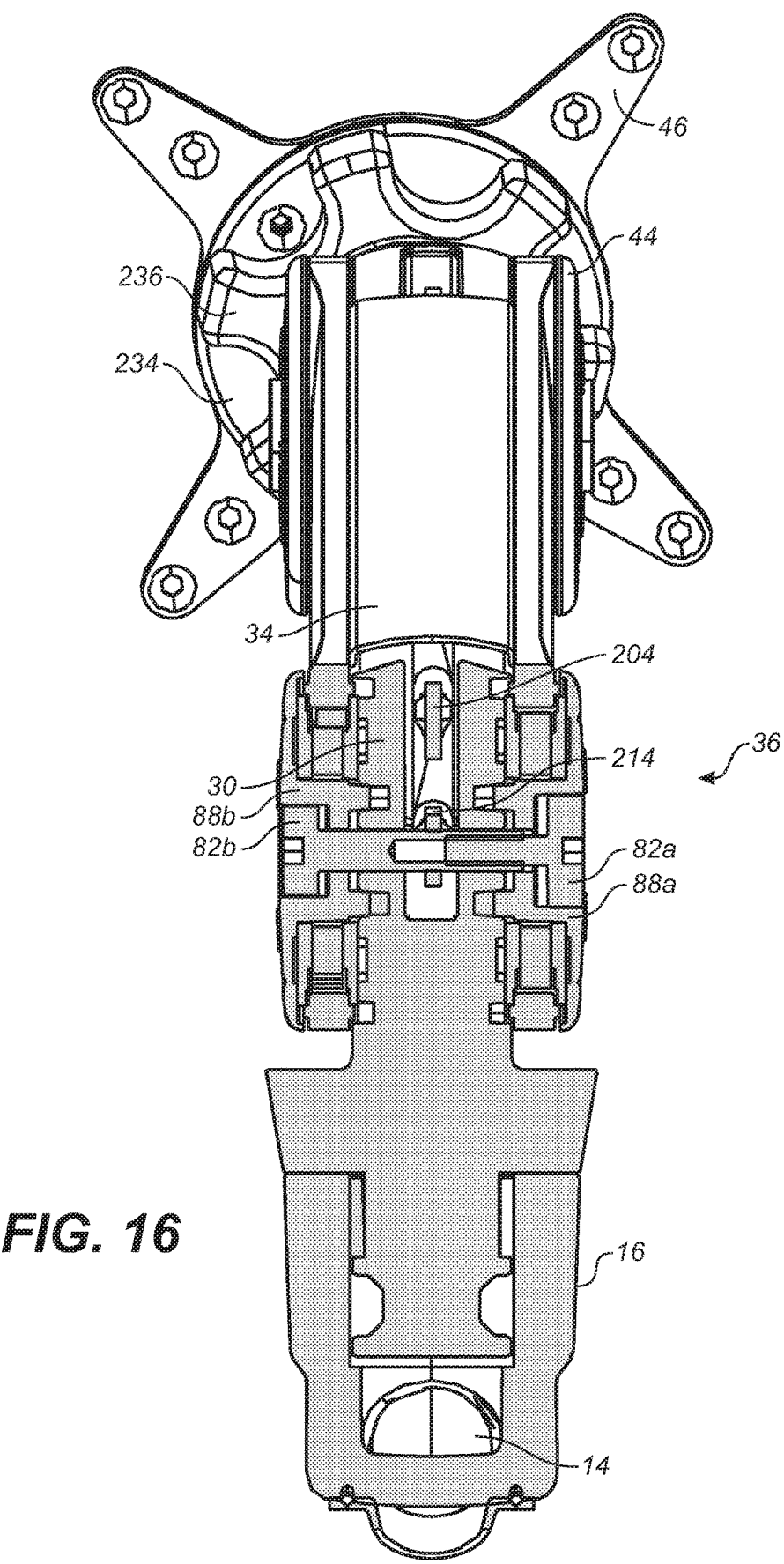
FIG. 16 is a rear view in elevation taken along section line 16-16 of FIG. 15.
Figure 17:
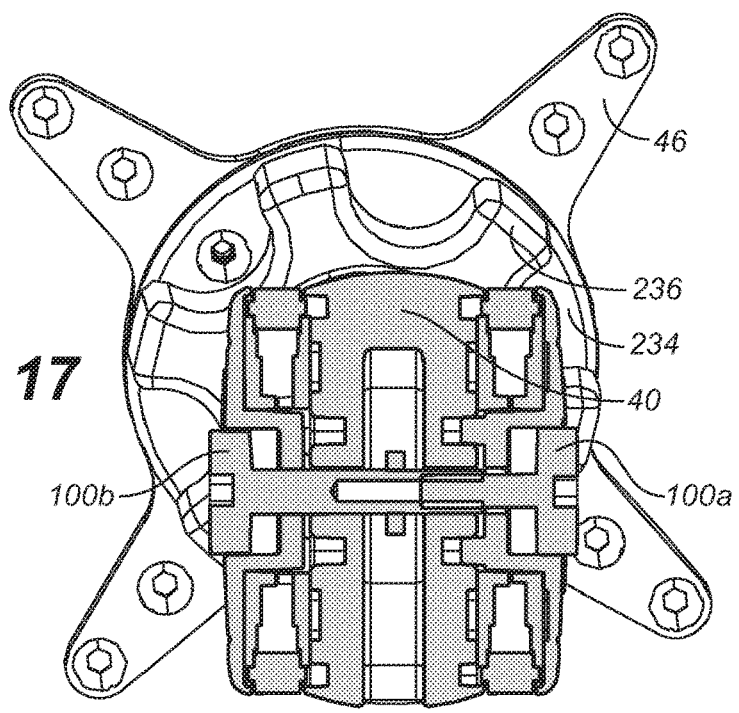
FIG. 17 is a rear view in elevation taken along section line 17-17 of FIG. 15.
Figure 18:
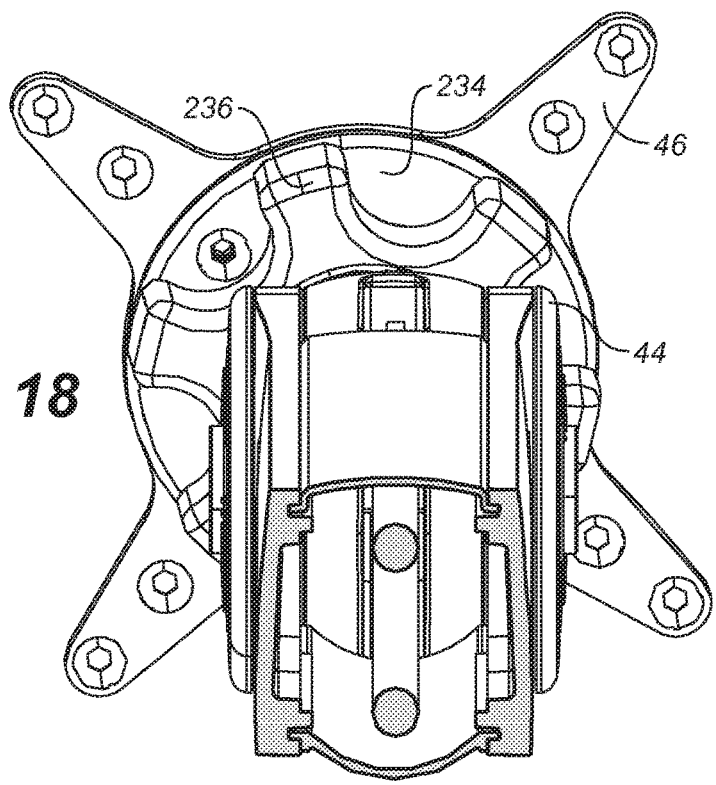
FIG. 18 is a rear view in elevation taken along section line 18-18 of FIG. 15.

Looking next at FIGS. 2, 4, and 11, there will be seen details of the moving arm assembly 34. (Further details are shown in FIGS. 4-7. Additionally, elements on opposing sides of the cam assemblies and freewheeling hubs are mirror images and identical, including those elements given reference numbers but not shown in the views.) As can be seen in this view, each moving arm 34 includes a left arm side 34a and a right arm side 34b, each bone-shaped side shaped similarly to a ratcheting box wrench, with a medial bar portion 34a', 34b', a left and right side proximal one-way cam assembly 70a, 70a, forming the central core of the left and right side proximal one-way freewheeling hubs 36a, 36b, and left and right distal one-way cam assemblies 72a, 72b.

The proximal one-way cam assemblies 70a, 70b, and in turn the proximal portions of the right arm side and left arm side, are secured to the support arm junction 30 on disk-shaped or circular planar bearing surfaces 33a, 33b, having a central threaded female hole 35a, 35b (latter not shown). Note should be taken that the bearing surfaces 33a, 33b include a plurality of holes and slots or other openings 37a, 37b, configured in a generally uniform and symmetrical pattern around the central threaded female holes.

Each side of the each of the left and right proximal cam assemblies is circumscribed with a circumferential wall 74a, 74b, integrally formed in the left and right arm sides 34a, 34b. Interiorly (see FIG. 4), the proximal cam assemblies each include a one-way cam ring 76a, 76b having recesses 78a, 78b defined by evenly spaced cams 79a, 79b. Friction pins 79a, 79b, are captured between the cam rings and the circumferential walls, and are further secured on the outer and inner sides of the cam assemblies by friction discs 80a, 80b, 80c, 80d.

Attachment of the proximal portions of the left and right cam assemblies to the support arm junction 30 is achieved using a tensioning bolt 82a, 82b, inserted through a plurality of Bellville (spring) washers 84a, 84b and a central opening 86a, 86b, in a brake rotor cap 88a, 88b. The brake rotor caps provide a bearing surface against which tension from tensioning bolts 82a, 82b and resilient Bellville (spring) washers 84a, 84b, urge the cam assemblies against the friction discs 80a, 80b, which are captured so as to engage the support arm junction surfaces 33a, 33b, so as to provide selective braking and/or adjustable resistance to rotation of the moving arm 34 in relation to the static arm 16.

Planar friction discs 80a, 80b, 80c, 80d, are fabricated from slightly deformable and resilient material, preferably nylon, and when the tensioning bolts 82a, 82b are sufficiently tightened, small portions of the interior surfaces of the discs are urged (in effect, bulging) into the openings 37a, 37b in the bearing surfaces 33a, 33b of the support arm junction 30. Accordingly, the force required to effect rotation of the left and right side arms 34a, 34b is adjusted, in part, by the tension placed on the tensioning bolts.

Left and right distal cam assemblies 72a, 72b are configured and structures in an identical manner in relation to the tilt joint 40, the latter also including circular planar bearing surfaces 43a, 43b, corresponding in design with those of the support arm junction, and thus including central threaded females holes 45a, 45b, and a plurality of uniformly spaced openings 47a, 47b. The distal cam assemblies again include circumferential walls 90a, 90b, integrally formed in the distal ends of the left arm side and right arm side, 34a, 34b, respectively. Left and right distal cam rings 92a, 92b, have recesses 93a, 93b, in which friction pins 94a, 94b, are disposed and captured between the walls and cam rings. Left and right distal friction disc pair 94a, 94b, encloses the left arm side distal cam assembly, and friction disc pair, 94c, 94d enclose the right side arm distal cam assembly. Once again brake rotor caps 96a, 96b provide a bearing surface against which tension from tensioning bolts 98a, 98b and resilient Bellville (spring) washers 100a, 100b, urge the cam assemblies against the friction discs 94a, 94b, which are captured so as to engage the tilt joint surfaces 43a, 43b, again providing selective braking and/or adjustable resistance to rotation of the tilt joint 40 in relation to the moving arm 34.

The tilt joint 40 may be pivotally coupled to the VESA mounting plate 46 through a quick disconnect assembly 120, which includes a quick disconnect hub 122 having a rear bearing housing 124 into which upper and lower nylon flange bushings 126, 128 are inserted. The housing 124 slides into a receiver 130 on the tilt joint and is secured with a turn adjustment plug 132 and adjustment bolt 134. In turn, the quick disconnect hub is coupled to a mounting button 136 affixed to the back of the VESA mounting plate 46 through a quick disconnect clamp 138. A feature of convenience is the system hex wrench 140 secured to the back of the mounting plate on a wrench holder 142.

Figure 5:
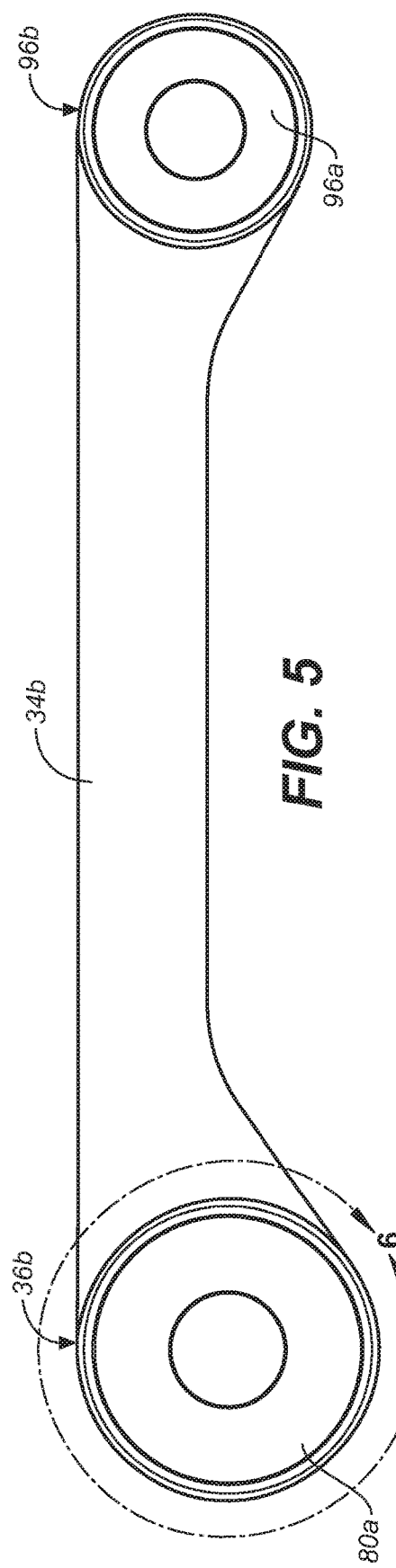
FIG. 5 is a left side view in elevation of the assembled right side arm of the support moving arm.
Figure 7:
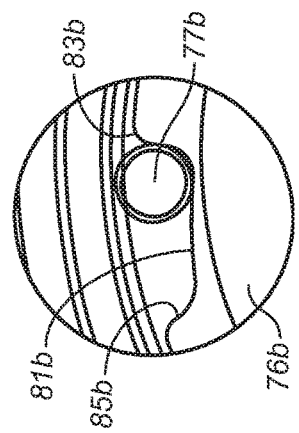
FIG. 7 is a highly detailed view of the cam configuration in the trapped roller hub of FIG. 6, as taken along section line 7-7.
Figure 6:
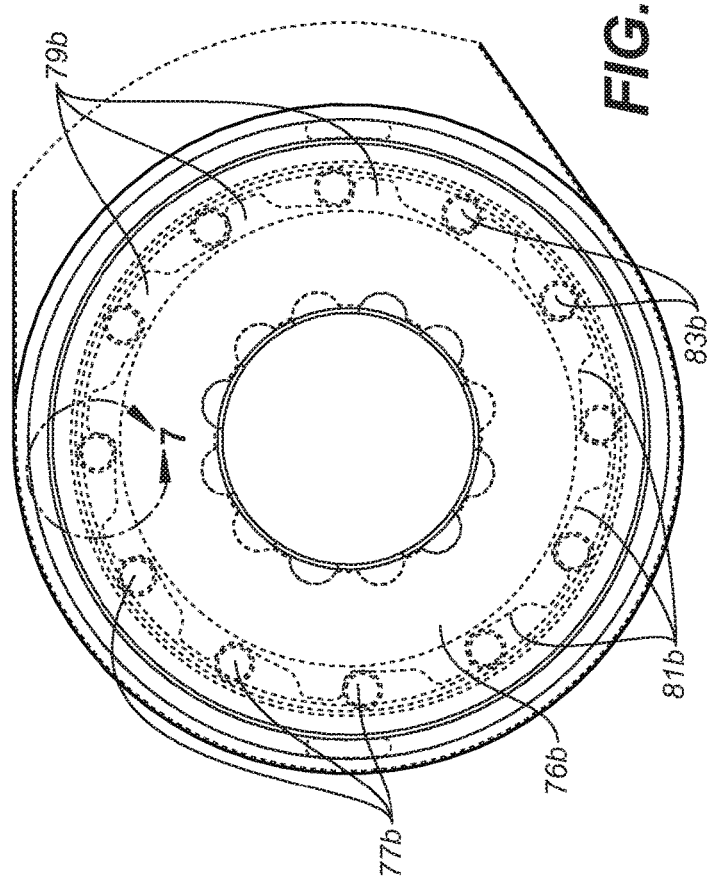
FIG. 6 is a detailed view of the trapped roller hub at the proximal end of the support moving arm, as taken along section line 6-6 of FIG. 5.

Referring next to FIGS. 5-7, there is shown detail of the interior one-way freewheel hub 36b employed in the present invention. This is a modified trapped roller hub using gravity instead of springs to maintain friction pin (roller) 77b engagement with the cams 79b of the cam ring 76b. FIG. 6 shows the pin configuration when the hub is moving (rotating) in the freewheeling direction—i.e., counterclockwise. When in this configuration, the friction pins are urged down the ramped surface 81b, between cam lobes slope and against the counterclockwise side 83b of each cam lobe. When so positioned, resistance to rotation is minimal, thus enabling a user to move the moving arm 34 counterclockwise relative to the static arm of the monitor support. Movement in that manner elevates the distal end, and thus the mounting plate, of the assembly, and by extension anything mounted on the mounting plate. However, once elevation (counterclockwise) movement is ended, any movement in the counterclockwise direction urges the friction pins 77b up-ramp and against the clockwise side 85b of the cam lobes. This is the "locked" configuration, though it must be said that rotation about the hubs is simply made more difficult to a practical degree, i.e., the degree needed to support the mounted load while allowing movement with a small amount of additional load or force. Thus, rotation is prevented or constrained up to a predetermined torque, set both by pin/lobe configurations and by the tension set by the user through the tensioning bolts, which governs the degree to which the friction discs deform into the support arm junction circular planar surface 33b.

Figure 8B:
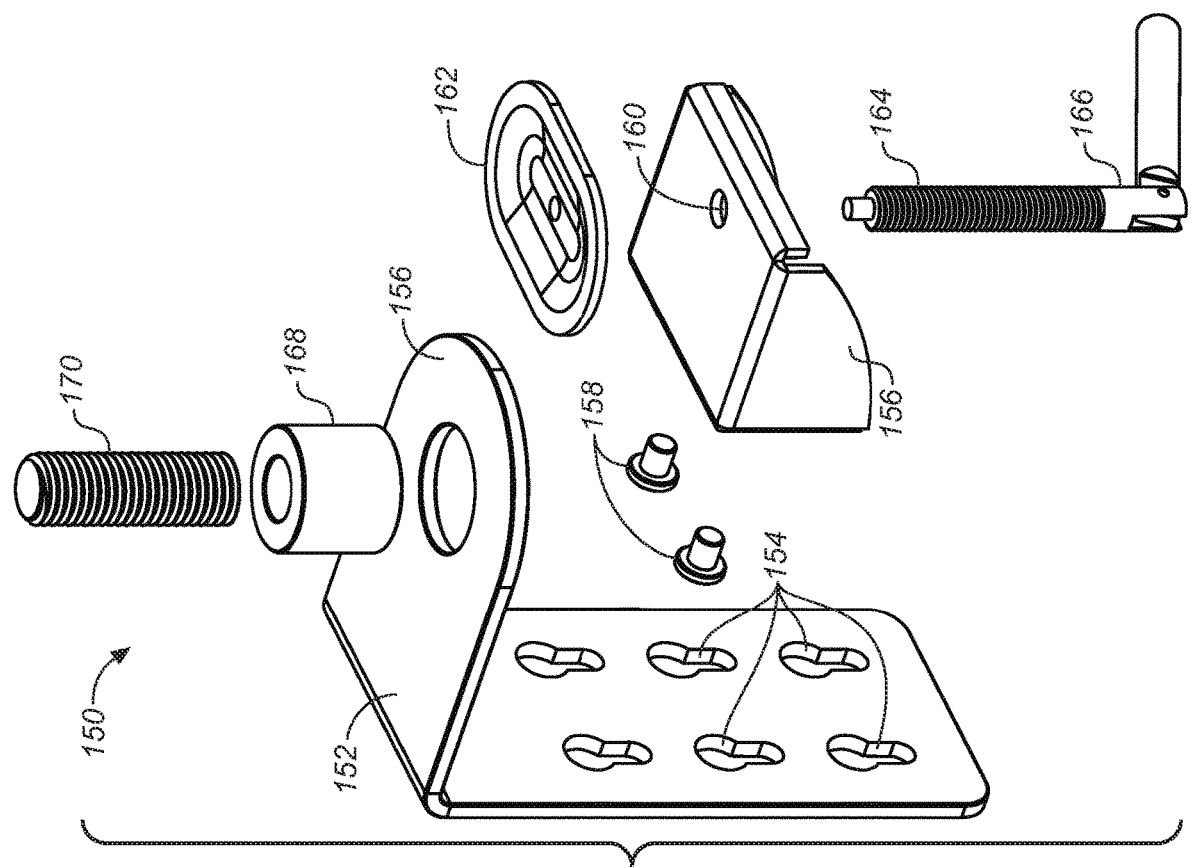
FIG. 8B is an exploded view thereof.
Figure 8A:
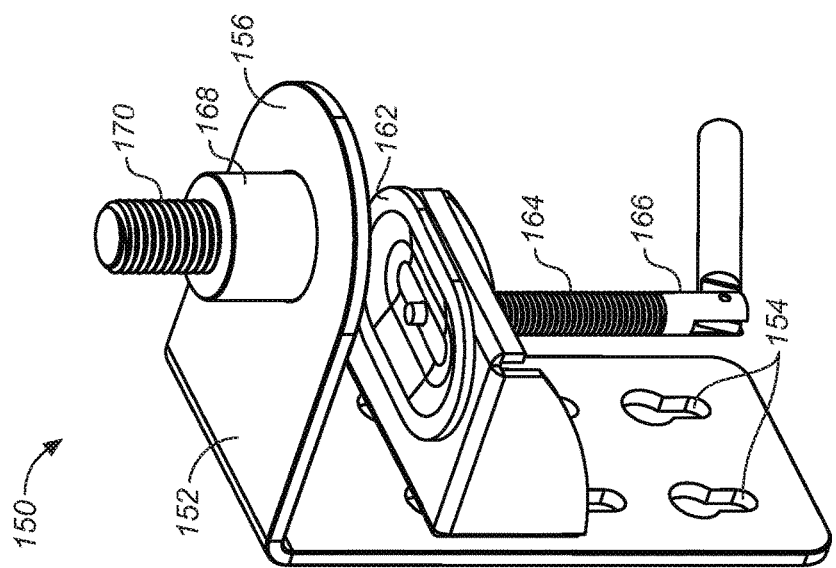
FIG. 8A is an upper right rear perspective view of the desktop/table clamp assembly used for securing the vertical support post of the present invention.
Figure 9:
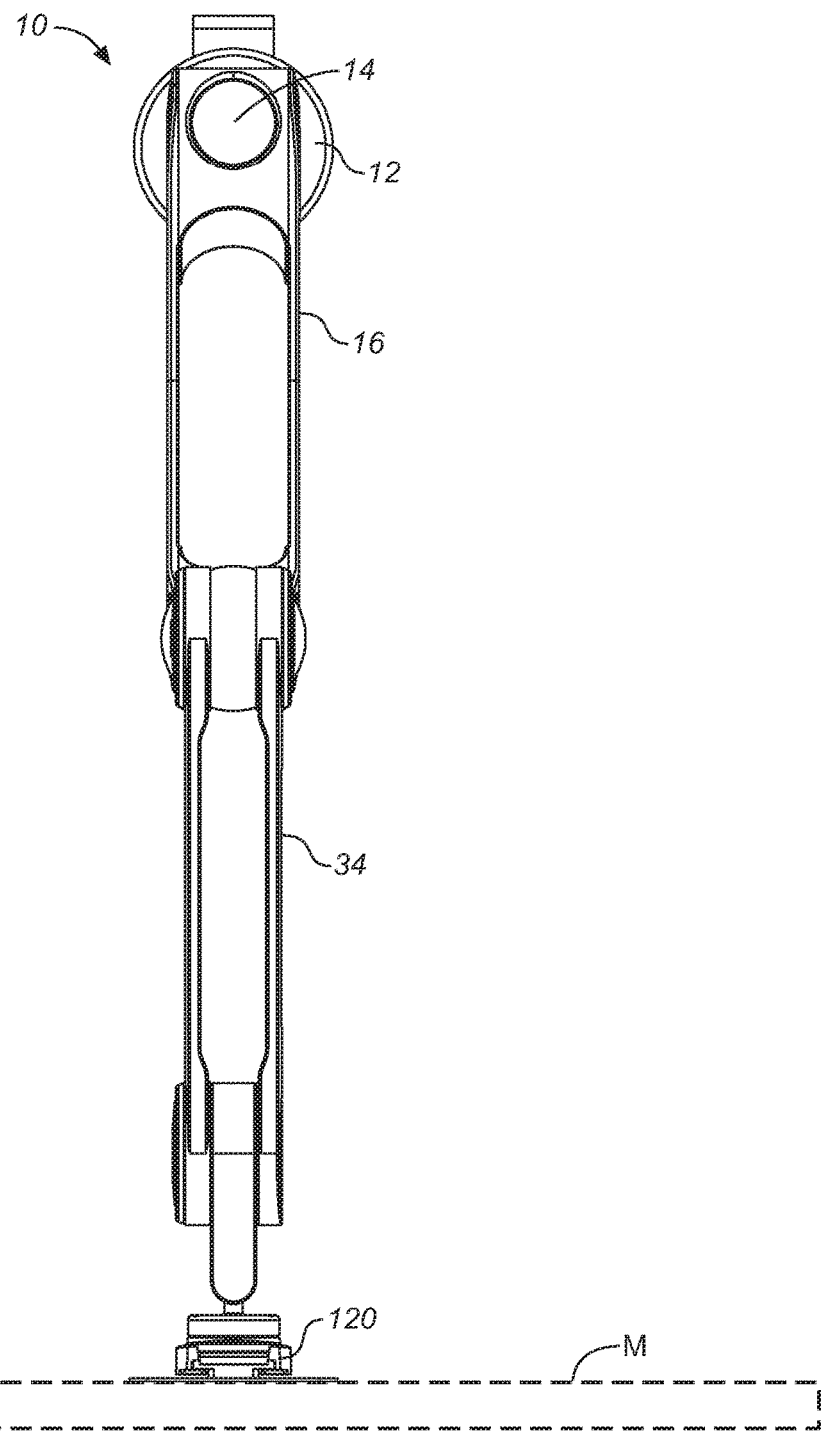
FIG. 9 is a top plan view of the assembled monitor support arm.

Looking next at FIGS. 8A-8B, there is shown an embodiment of the table clamp assembly 150 that may be employed in the present invention. This assembly includes an upper clamp bracket 152 having T-slots 154 to which a lower clamp bracket 156 having welded hanger tabs 158 is removably attached. The lower clamp bracket includes a through hole 160 over which a bottom cup 162 is disposed and through which the threaded rod 164 of a toggling clamp handle 166 is threadably inserted. An upper threaded receiver 168 holds a mounting stud 170. The anchor pole (ref no. 14 in FIG. 1A-1B) is placed on the mounting stud. A plastic knob may be installed to facilitate gripping to tighten the clamp and to reduce discomfort caused by legs and knees colliding with a toggling clamp handle.

Figure 10:
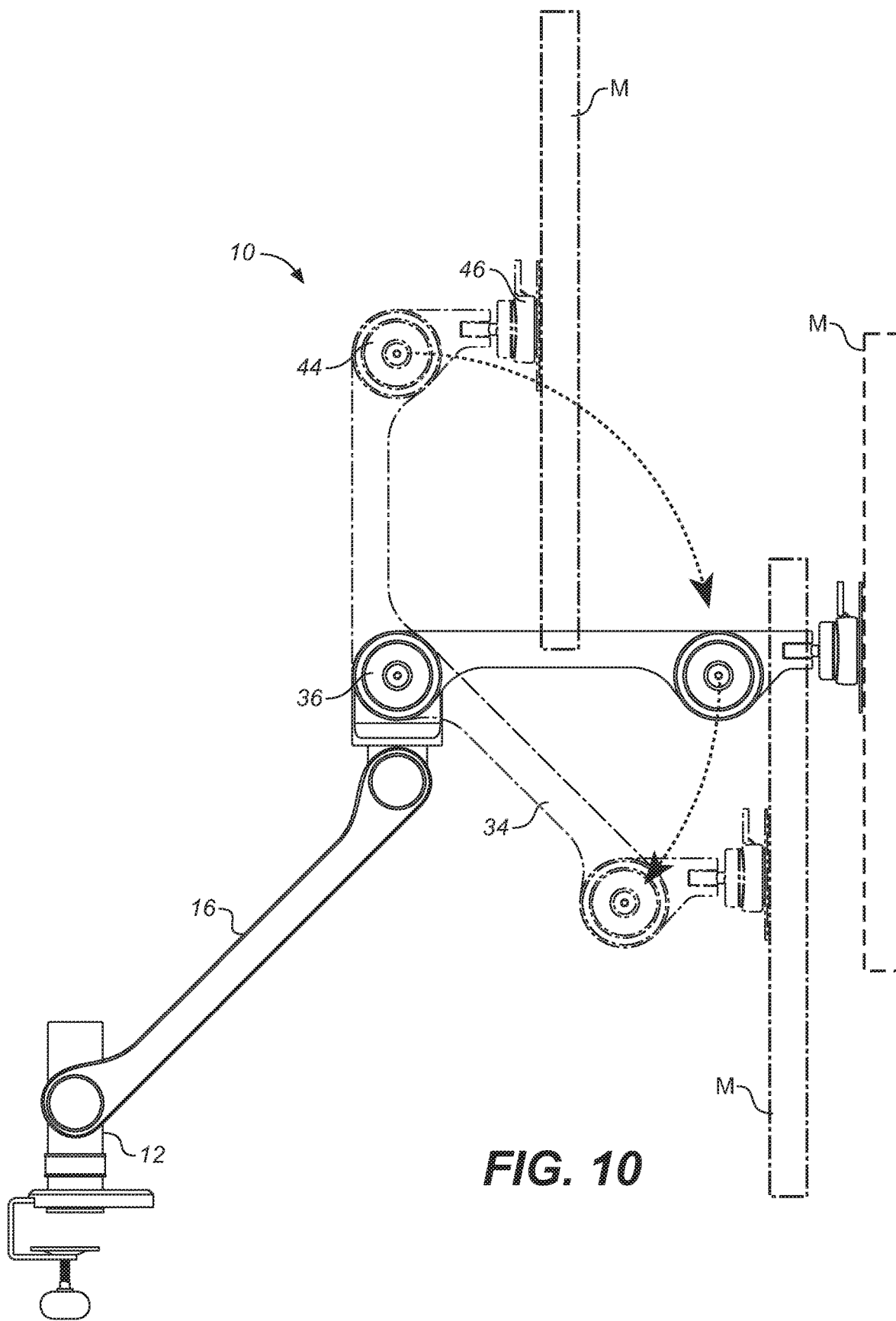
FIG. 10 is a side view in elevation showing how the monitor support arm maintains monitor tilt over a range of vertical height adjustments; ditto VESA from FIG. 9

Next, looking at FIG. 10, a significant advantage of the monitor support arm of the present invention is that it maintains the angle of the visual display panel M relative to the horizontal plane as it is moved both up and down, making it eminently suitable for sit-stand workstations. It will be noted, however, that the angle is readily adjustable should the user wish to tilt the monitor to a different angle. [Note: Both the foregoing embodiment and the alternative discussed fully below (termed "the 4-bar" embodiment) achieve this end, but the 4-bar achieves it when the user simply raises the monitor; the above-described embodiment requires simultaneous compound movements, which are more difficult, and if the monitor is heavy, e.g. >5 pounds, increasingly difficult.

Referring now to FIGS. 12-18, in an alternative embodiment 200 the monitor support arm further includes a parallelogram 4-bar linkage 202 coupling the support arm junction 30 and the tilt joint 40. [Note: Structural and operational elements in these views which duplicate those in the earlier views (FIGS. 1A-11) share identical reference numbers, even if design features vary. New and/or newly noted elements bear new numbering.]

The 4-bar linkage 202 augments structural support provided by the moving arm itself and includes an upper link 204 pivotally connected at its proximal end to the support arm junction 30 at an upper pivot point 206, which is located in the slot 31 in the support arm junction, and at its distal end to the tilt joint 40 at an upper pivot point 208 located in a slot 41 in the tilt joint. Pivot pins 210, 212 secure the upper link at each end.

The 4-bar linkage next includes a lower link 214 pivotally connected at its proximal end to the support arm junction 30 at a central pivot point 216, which is also located in the slot 31 in the support arm junction; it is pivotally connected at its distal end to the tilt joint 40 at a central pivot point 218 located in slot 41 in the tilt joint. Pivot pins 220, 222 secure the lower link at each end.

Use of the additional parallelogram 4-bar linkage significantly increases the holding power of the monitor support arm. With the tensioning bolts tightened to substantially the same degree, the inventive monitor support arm having the additional parallelogram 4-bar linkage supports approximately twice the weight of the earlier-described embodiment before yielding under load. Accordingly, for applications in which the user of a large flat screen displays is contemplated (or when multiple screens are supported by the support arm), the four-bar linkage is preferred.

Referring more particularly to FIGS. 12-15, it will be seen that in an embodiment the monitor support arm, the distal end of the arm at the tilt joint may couple to a swiveling ball joint assembly 230, adding considerably to adjustment options. The ball joint assembly couples to the tilt joint 40 with a pivot arm and ball member 232. The ball portion is then swivelingly coupled to a locking socket receptacle 234 with a hand nut. An additional benefit of the swiveling ball joint is that it allows for "tool-less mounting/dismounting of the monitor"; one simply backs the hand nut off the threads and pulls the ball out of the socket.

Aesthetic features having utility in the support arm include a cord organizer 240 disposed in the static arm, which routes and conceals cords extending through the static arm, as well as upper and lower arm covers 242, 244, which contain and conceal cords extending through the hollow portions of the moving arm.

Figure 19A:
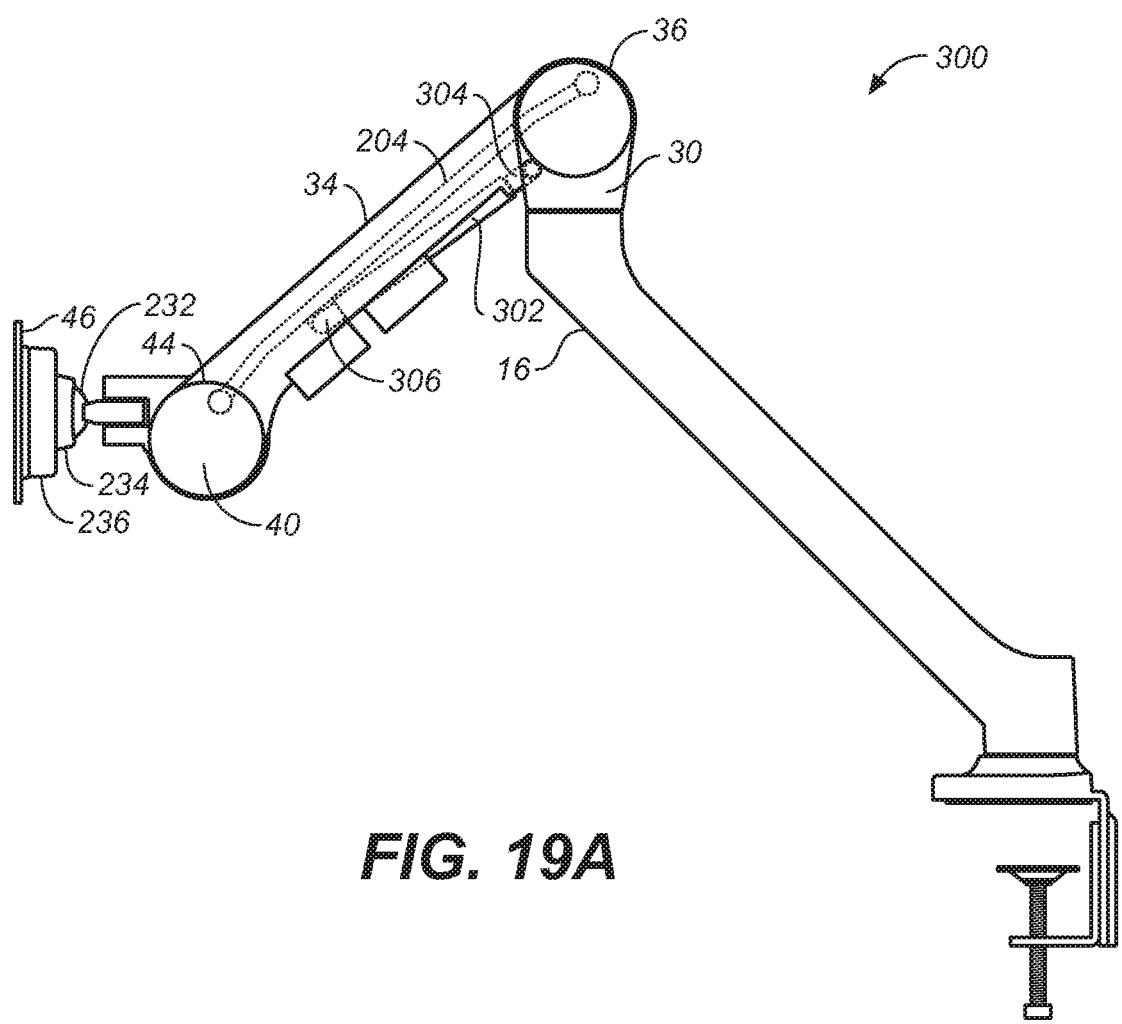
FIG. 19A is a partial cross-sectional side view in elevation of an alternative embodiment of the inventive support arm having a gas lift combined with the inventive one-way friction hubs, shown here with the distal hub and monitor mount disposed below the proximal hub.
Figure 19B:
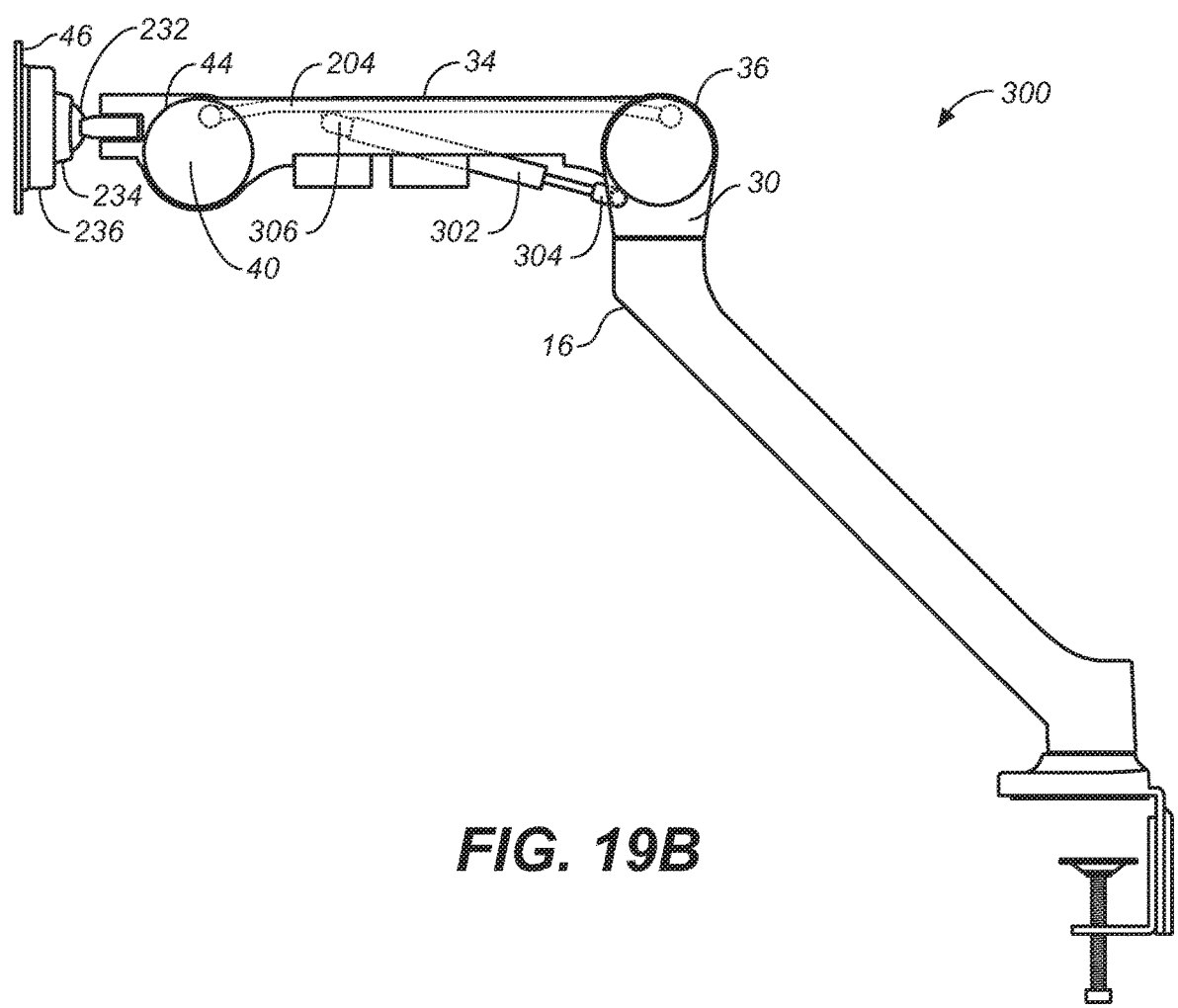
FIG. 19B is the same view with the support arm shown with the distal hub generally level with the proximal hub.
Figure 19C:
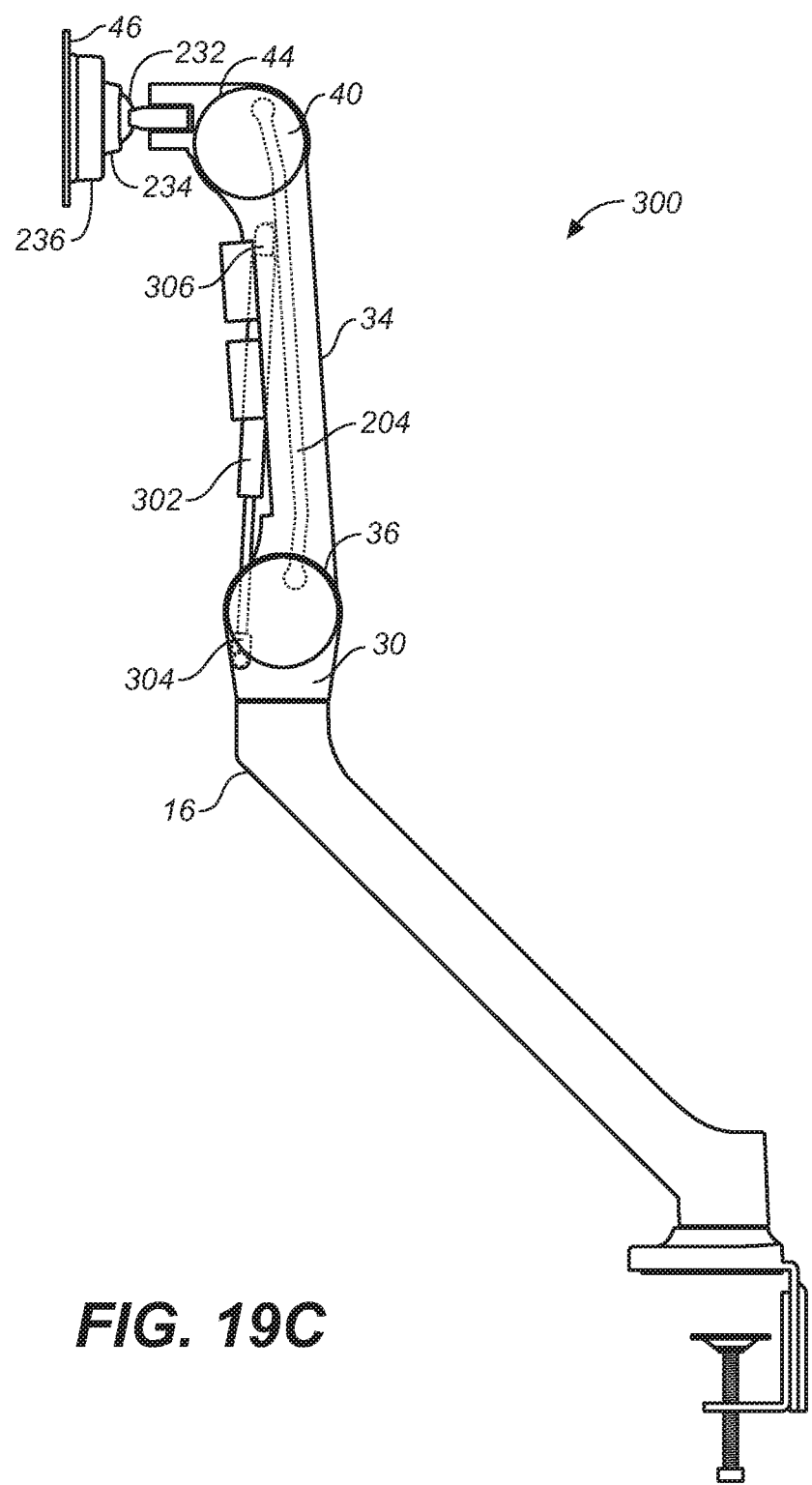
FIG. 19C is the same view showing the support arm shown with the distal hub disposed vertically above the proximal hub.

Looking next at FIGS. 19A-19C, there is shown yet another embodiment 300 which is in every respect identical to the embodiment of FIGS. 12-18, except that the lower link 214 has been removed and a gas lift 302 has been installed in the spaced created. The upper link 204 is retained. The gas lift 302 is pivotally connected at its proximal end 304 to the support arm junction 30 at a central pivot point, which is located in slot in the support arm junction 30; it is pivotally connected at a distal end pivot point 306 between the right and left sides of the moving arm 34. The gas lift and upper link together fix the center of rotation of the moving arm at the support arm junction.

From the foregoing it will be appreciated that in its most essential aspect, the present invention is a monitor support arm that includes in an embodiment a support assembly for attaching said monitor support arm to a surface; a static arm configured to mount rotatably to the mounting and support assembly at a proximal end and having a support arm junction at a distal end; a moving arm pivotally attached to the static arm at the support arm junction with a first one-way freewheel friction hub; and monitor mounting structure disposed on a distal end of the moving arm. In embodiments, a second one-way freewheel friction hub is disposed on the distal end of the moving arm to create a tilt joint. In an embodiment, the tilt joint further includes structure for pivotally coupling a VESA mounting plate having a quick disconnect assembly. This gives users latitude to adjust monitor height and lateral position while maintaining a desired precise monitor tilt angle.

The foregoing disclosure is sufficient to enable those with skill in the relevant art to practice the invention without undue experimentation. The disclosure further provides the best mode of practicing the invention now contemplated by the inventor.

What is claimed as invention is:

1. A monitor support arm, comprising:
a mounting assembly for mounting said monitor support arm to a work surface;
a static arm rotatably connected at a proximal end to said mounting assembly and having a support arm junction at a distal end;
a moving arm having a distal end with monitor mounting structure for mounting a monitor and pivotally connected at a proximal end to said support arm junction with a one-way freewheel friction hub, said one-way freewheel friction hub including a friction clutch with at least one fixed bearing surface having a plurality of openings and at least one deformable friction disc having a surface in a surface-to-surface contact with said bearing surface; and
tensioning structure which urges portions of said deformable friction disc into said openings of said bearing surface so as to introduce resistance to rotation of said moving arm in relation to said static arm.

2. The monitor support arm of claim 1, wherein said a one-way freewheel friction hub includes at least one modified trapped roller one-way freewheel which cooperates with said friction clutch to permit free elevation movement of a monitor mounted on said moving arm and which requires the application of force exceeding that of the monitor weight to lower a monitor mounted on said moving arm.

3. The monitor support arm of claim 1, wherein a pair of one-way trapped roller freewheel and friction clutches are coaxially joined on opposing sides of said support arm junction to form a first one-way freewheel friction hub.

4. The monitor support arm of claim 3, further including a second one-way freewheel friction hub rotatingly disposed on said distal end to form a tilt joint, wherein said monitor mounting structure is pivotally affixed to said tilt joint.

5. The monitor and support arm of claim 4, wherein said second one-way freewheel friction hub is formed from a pair of trapped roller one-way freewheel and friction clutches coaxially joined on opposing sides of said distal end of said moving arm.

6. The monitor support arm of claim 5, further including parallel upper and lower links disposed between and coupled to said first and second one-way freewheel and friction hubs to form a four-bar parallelogram linkage which keeps a monitor mounted on said moving arm at a fixed tilt when said moving secondary arm is moved up and down.

7. The monitor support arm of claim 6, wherein said first one-way freewheel friction hub is a primary hub and said second one-way freewheel friction hub is a secondary hub, and said primary hub controls monitor height and said secondary hub controls monitor tilt angle, and said primary and secondary hubs combine to enable height, horizontal, and tilt adjustments to fit user preferences.

8. The monitor support arm of claim 1, wherein said friction disc and said bearing surface are each generally planar.

9. A monitor support, comprising:
a mounting and support assembly for attaching a monitor support arm to a surface;
a static arm configured to mount rotatably to said mounting and support assembly at a proximal end and having a support arm junction at a distal end;
a moving arm pivotally attached to said static arm at said support arm junction with a first one-way freewheel friction hub; and
monitor mounting structure mounted on a distal end of said moving arm;
wherein said static arm rotates about said mounting and support assembly so as to move laterally in a generally horizontal plane; and wherein the monitor support further including a second one-way freewheel friction hub.

10. The monitor support of claim 9, wherein said moving arm pivotally moves vertically up and down about said support arm junction in a generally vertical plane.

11. The monitor support of claim 10, wherein said support arm junction includes first and second opposing planar surfaces facing 180 degrees apart from one another and a horizontally oriented axis disposed through said support arm junction, and said one-way freewheeling friction hub comprises a first trapped roller and friction disc assembly engaging said first planar surface of said support arm junction and a second trapped roller and friction disc assembly engaging said second planar surface of said support arm junction, and further including tensioning structure to adjust tension on each of said first and second trapped roller and friction disc assemblies on said first and second planar surfaces on said support arm junction.

12. The monitor support of claim 11, wherein said first and second planar surfaces of said support arm junction each include a plurality of apertures for engaging said friction discs.

13. The monitor support of claim 12, wherein each of said friction discs are deformable and have a generally planar surface engaging a surface of one of said first and second opposing planar surfaces of said support arm junction.

14. The monitor support of claim 13, wherein increasing tension with said tensioning structure urges said friction discs into said apertures of said first and second planar surfaces of said support arm junction.

15. The monitor support of claim 9, further including a tilt joint coupled to said moving arm through said second freewheel friction hub, and a monitor mounting plate pivotally coupled to said tilt joint.

16. The monitor support of claim 9, wherein said one-way freewheel friction hub is gravity-based and includes first and second one-way cam assemblies, each having:
a circumferential wall surrounding a one-way cam ring with recesses defined by evenly spaced cams;

a plurality of friction pins captured between said cam rings and said circumferential walls and secured on a side by a friction disc;

wherein said cam assemblies use gravity instead of springs to maintain friction pin engagement with the cams of the cam ring.

17. The monitor support of claim 16, wherein said freewheel friction hub is mounted to said support arm junction using a tensioning bolt.

18. The monitor support of claim 17, wherein said tensioning bolt is inserted through a plurality of spring and a central opening in a brake rotor cap disposed in said support arm junction, such that the brake rotor caps provide a bearing surface against which tension said tensioning bolt and said spring washers urge said cam assemblies against said friction discs so as to provide selective braking and adjustable resistance to rotation of said moving arm in relation to said static arm.

* * * * *